US006806247B2

United States Patent
Bogdan et al.

(10) Patent No.: US 6,806,247 B2
(45) Date of Patent: Oct. 19, 2004

(54) AZEOTROPE-LIKE COMPOSITIONS OF TETRAFLUOROETHANE, PENTAFLUOROPROPANE, METHYLBUTANE AND WATER

(75) Inventors: Mary C. Bogdan, Buffalo, NY (US); Hang T. Pham, Amherst, NY (US); David J. Williams, East Amherst, NY (US); Gary M. Knopeck, Lakeview, NY (US); Rajiv R. Singh, Getzville, NY (US); Kane D. Cook, Eggertsville, NY (US)

(73) Assignee: Honeywell International Inc., Morristown, NJ (US)

( * ) Notice: Subject to any disclaimer, the term of this patent is extended or adjusted under 35 U.S.C. 154(b) by 297 days.

(21) Appl. No.: 10/166,445

(22) Filed: Jun. 10, 2002

(65) Prior Publication Data

US 2003/0004077 A1 Jan. 2, 2003

Related U.S. Application Data

(60) Provisional application No. 60/297,202, filed on Jun. 8, 2001.

(51) Int. Cl.$^7$ .............................. C11D 7/50; C08J 9/14
(52) U.S. Cl. ................. 510/411; 510/177; 510/273; 510/365; 510/407; 510/410; 510/417; 252/67
(58) Field of Search ............................ 510/177, 273, 510/365, 407, 410, 411, 417

(56) References Cited

U.S. PATENT DOCUMENTS

| | | | | |
|---|---|---|---|---|
| 2,834,748 | A | 5/1958 | Bailey et al. | 260/42 |
| 2,846,458 | A | 8/1958 | Halsuka | 260/448.2 |
| 2,917,480 | A | 12/1959 | Bailey et al. | 260/42 |
| 5,635,098 | A | 6/1997 | Lunger et al. | |
| 6,043,291 | A | 3/2000 | Takeyasu et al. | |
| 6,100,230 | A | * 8/2000 | Bement et al. | 510/415 |
| 6,288,135 | B1 | * 9/2001 | Bement et al. | 521/174 |
| 6,635,686 | B2 | * 10/2003 | Bogdan et al. | 521/131 |
| 6,686,326 | B2 | * 2/2004 | Bogdan et al. | 510/411 |

OTHER PUBLICATIONS

Saunders, J.H. and Frisch, K.C. Polyurethanes Chemistry and Technology *Interscience Publishers*, vol. XVI, Part I, 219–223 & Part II, 193–201.

* cited by examiner

*Primary Examiner*—Gregory Webb
(74) *Attorney, Agent, or Firm*—Colleen D. Szuch

(57) ABSTRACT

This invention provides azeotrope-like compositions of 1,1,1,2-tetrafluoroethane, 1,1,1,3,3-pentafluoropropane-245fa and water that are environmentally desirable for use as refrigerants, aerosol propellants, metered dose inhalers, blowing agents for polymer foam, heat transfer media, and gaseous dielectrics.

24 Claims, 1 Drawing Sheet

AZEOTROPE-LIKE COMPOSITIONS OF TETRAFLUOROETHANE, PENTAFLUOROPROPANE, METHYLBUTANE AND WATER

CROSS-REFERENCE TO RELATED APPLICATION

This application claims priority to provisional application Ser. No. 60/297,202, which was filed with the United States Patent and Trademark Office on Jun. 8, 2001, and is incorporated herein by reference.

FIELD OF THE INVENTION

The present invention provides azeotrope-like compositions of tetrafluoroethane, pentafluoropropane, methylbutane, and water, and uses thereof.

BACKGROUND

Fluorocarbon based fluids have found widespread use in industry in a number of applications, including as refrigerants, aerosol propellants, blowing agents, heat transfer media, and gaseous dielectrics. Because of the suspected environmental problems associated with the use of some of these fluids, it is desirable to use fluids having low or even zero ozone depletion potential, such as hydrofluorocarbons ("HFC's"). Thus, the use of fluids that do not contain chlorofluorocarbons ("CFCs") or hydrochlorofluorocarbons ("HCFCs") is desirable. Additionally, the use of single component fluids or azeotropic mixtures, which do not fractionate on boiling and evaporation, is desirable. However, the identification of new, environmentally-safe, non-fractionating mixtures is complicated due to the fact that azeotrope formation is not readily predictable.

The industry is continually seeking new fluorocarbon based mixtures that offer alternatives, and are considered environmentally safer substitutes for CFCs and HCFCs. Of particular interest are mixtures containing both hydrofluorocarbons and non-fluorocarbons, both of low ozone depletion potentials. Such mixtures are the subject of this invention.

DESCRIPTION OF THE PREFERRED EMBODIMENT

Figure 1:
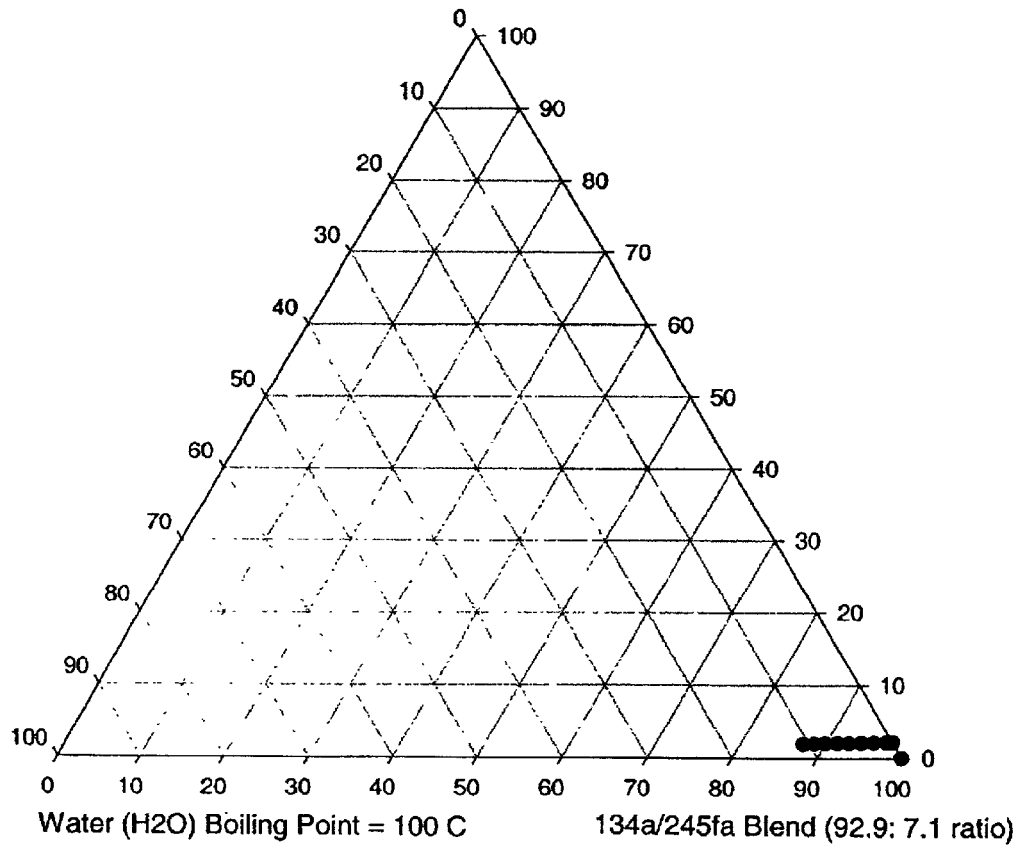
FIG. 1 is a boiling point plot for compositions comprising 1,1,1,2-tetrafluoroethane, 1,1,1,3,3-pentafluoropropane, 2-methylbutane and water.

The present inventors have developed several compositions that can help to satisfy the continuing need for substitutes for CFCs and HCFCs. In one embodiment, the present invention provides azeotrope-like compositions comprising 1,1,1,2-tetrafluoroethane ("HFC-134a"), 1,1,1,3,3-pentafluoropropane ("HFC-245fa"), 2-methylbutane and water.

The preferred compositions of the invention provide environmentally desirable, zero ozone depletion potential replacements for currently used CFC's and HCFC's. Additionally, the compositions of the invention exhibit characteristics that make the compositions better CFC and HCFC substitutes than any of 1,1,1,2-tetrafluoroethane, 1,1,1,3,3-pentafluoropropane, 2-methylbutane or water alone.

The Compositions

The present compositions are azeotrope-like compositions. As used herein, the term "azeotrope-like" is intended in its broad sense to include both compositions that are strictly azeotropic and compositions that behave like azeotropic mixtures. From fundamental principles, the thermodynamic state of a fluid is defined by pressure, temperature, liquid composition, and vapor composition. An azeotropic mixture is a system of two or more components in which the liquid composition and vapor composition are equal at the stated pressure and temperature. In practice, this means that the components of an azeotropic mixture are constant boiling and cannot be separated during a phase change.

Azeotrope-like compositions are constant boiling or essentially constant boiling. In other words, for azeotrope-like compositions, the composition of the vapor formed during boiling or evaporation is identical, or substantially identical, to the original liquid composition. Thus, with boiling or evaporation, the liquid composition changes, if at all, only to a minimal or negligible extent. This is to be contrasted with non-azeotrope-like compositions in which, during boiling or evaporation, the liquid composition changes to a substantial degree. All azeotrope-like compositions of the invention within the indicated ranges as well as certain compositions outside these ranges are azeotrope-like.

The azeotrope-like compositions of the invention may include additional components that do not form new azeotrope-like systems, or additional components that are not in the first distillation cut. The first distillation cut is the first cut taken after the distillation column displays steady state operation under total reflux conditions. One way to determine whether the addition of a component forms a new azeotrope-like system so as to be outside of this invention is to distill a sample of the composition with the component under conditions that would be expected to separate a non-azeotropic mixture into its separate components. If the mixture containing the additional component is non-azeotrope-like, the additional component will fractionate from the azeotrope-like components. If the mixture is azeotrope-like, some finite amount of a first distillation cut will be obtained that contains all of the mixture components that is constant boiling or behaves as a single substance.

It follows from this that another characteristic of azeotrope-like compositions is that there is a range of compositions containing the same components in varying proportions that are azeotrope-like or constant boiling. All such compositions are intended to be covered by the terms "azeotrope-like" and "constant boiling". As an example, it is well known that at differing pressures, the composition of a given azeotrope will vary at least slightly, as does the boiling point of the composition. Thus, an azeotrope of A and B represents a unique type of relationship, but with a variable composition depending on temperature and/or pressure. It follows that, for azeotrope-like compositions, there is a range of compositions containing the same components in varying proportions that are azeotrope-like. All such compositions are intended to be covered by the term azeotrope-like as used herein.

The present invention provides azeotrope and azeotrope-like compositions comprising 1,1,1,2-tetrafluoroethane, 1,1,1,3,3 -pentafluoropropane, 2-methylbutane and water. Preferably, the novel azeotrope-like compositions of the present invention comprise effective amounts of 1,1,1,2-tetrafluoroethane, 1,1,1,3,3-pentafluoropropane, 2-methylbutane and water. The term "effective amounts" as used herein refers to the amount of each component which upon combination with the other component or components, results in the formation of the present azeotrope-like compositions.

Preferred embodiments preferably provide azeotrope-like compositions comprising, and preferably consisting essentially of, from about 10 to about 97 parts by weight HFC-134a, from about 1 to about 50 parts by weight of HFC-245fa, from about 1 to about 50 parts by weight of 2-methylbutane and from about 1 to about 50 parts by weight water. Preferred compositions are characterized by a boiling point of −25.80° C.±4° C., preferably ±2° C., more preferably ±1° C. at 14.61 psia.

The preferred, more preferred, and most preferred compositions of this embodiment are set forth in Table 1. The numerical ranges in Table 1 are to be understood to be prefaced by the term "about".

TABLE 1

| Components | Preferred (wt %) | More Preferred (wt %) | Most Preferred (wt %) |
| --- | --- | --- | --- |
| HFC-134a | 10–97 | 40–97 | 70–97 |
| HFC-245fa | 1–50 | 1–25 | 1–10 |
| 2-methylbutane | 1–50 | 1–25 | 1–10 |
| water | 1–50 | 1–25 | 1–10 |

Uses of the Compositions

The compositions of the present invention may be used in a wide variety of applications as substitutes for CFCs and HCFCs. For example, the present compositions are useful as solvents, blowing agents, refrigerants, cleaning agents and aerosols.

One embodiment of the present invention relates to a blowing agent comprising one or more of the azeotrope-like compositions of the invention. In other embodiments, the invention provides foamable compositions, and preferably polyurethane and polyisocyanurate foam compositions, and methods of preparing foams. In such foam embodiments, one or more of the present azeotrope-like compositions are included as a blowing agent in a foamable composition, which composition preferably includes one or more additional components capable of reacting and foaming under the proper conditions to form a foam or cellular structure, as is well known in the art. The present methods preferably comprise providing such a foamable composition and reacting it under conditions effective to obtain a foam, and preferably a closed cell foam. The invention also relates to foam, and preferably closed cell foam, prepared from a polymer foam formulation containing a blowing agent comprising the azeotrope-like composition of the invention.

Any of the methods well known in the art, such as those described in "Polyurethanes Chemistry and Technology," Volumes I and II, Saunders and Frisch, 1962, John Wiley and Sons, New York, N.Y., which is incorporated herein by reference, may be used or adapted for use in accordance with the foam embodiments of the present invention. In general, such preferred methods comprise preparing polyurethane or polyisocyanurate foams by combining an isocyanate, a polyol or mixture of polyols, a blowing agent or mixture of blowing agents comprising one or more of the present compositions, and other materials such as catalysts, surfactants, and optionally, flame retardants, colorants, or other additives. It is convenient in many applications to provide the components for polyurethane or polyisocyanurate foams in pre-blended formulations. Most typically, the foam formulation is pre-blended into two components. The isocyanate and optionally certain surfactants and blowing agents comprise the first component, commonly referred to as the "A" component. The polyol or polyol mixture, surfactant, catalysts, blowing agents, flame retardant, and other isocyanate reactive components comprise the second component, commonly referred to as the "B" component. Accordingly, polyurethane or polyisocyanurate foams are readily prepared by bringing together the A and B side components either by hand mix for small preparations and, preferably, machine mix techniques to form blocks, slabs, laminates, pour-in-place panels and other items, spray applied foams, froths, and the like. Optionally, other ingredients such as fire retardants, colorants, auxiliary blowing agents, and even other polyols can be added as a third stream to the mix head or reaction site. Most conveniently, however, they are all incorporated into one B-component as described above.

It is also possible to produce thermoplastic foams using the compositions of the invention. For example, conventional foam polyurethanes and isocyanurate formulations may be combined with the azeotrope-like compositions in a conventional manner to produce rigid foams.

Azeotrope-like mixtures containing HFC-134a in accordance with the present invention are particularly suitable as foam blowing agents since foams blown with HFC-134a have been found to possess low relative initial and aged thermal conductivity and good dimensional stability at low temperatures. Of particular interest are those azeotrope-like compositions of the present invention that optionally further contain other zero ozone depleting materials, such as, for example, other hydrofluorocarbons, e.g., difluoromethane (HFC-32); difluoroethane (HFC-152); trifluoroethane (HFC-143); tetrafluoroethane (HFC-134); pentafluoroethane (HFC-125); pentafluoropropane (HFC-245); hexafluoropropane (HFC-236); heptafluoropropane (HFC-227); pentafluorobutane (HFC-365) and inert gases, e.g., air, nitrogen, carbon dioxide. Where isomerism is possible for the hydrofluorocarbons mentioned above, the respective isomers may be used either singly or in the form of a mixture.

Dispersing agents, cell stabilizers, and surfactants may also be incorporated into the blowing agent mixture. Surfactants, better known as silicone oils, are added to serve as cell stabilizers. Some representative materials are sold under the names of DC-193, B-8404, and L-5340 which are, generally, polysiloxane polyoxyalkylene block co-polymers such as those disclosed in U.S. Pat. Nos. 2,834,748, 2,917, 480, and 2,846,458. Other optional additives for the blowing agent mixture may include flame retardants such as tri(2-chloroethyl)phosphate, tri(2-chloropropyl)phosphate, tri(2, 3-dibromopropyl)-phosphate, tri(1,3-dichloropropyl) phosphate, diammonium phosphate, various halogenated aromatic compounds, antimony oxide, aluminum trihydrate, polyvinyl chloride, and the like.

In another embodiment, the azeotrope-like compositions of this invention may be used as propellants in sprayable compositions, either alone or in combination with known propellants. The sprayable composition comprises, consists essentially of, and consists of a material to be sprayed and a propellant comprising, consisting essentially of, and consisting of the azeotrope-like compositions of the invention. Inert ingredients, solvents, and other materials may also be present in the sprayable mixture. Preferably, the sprayable composition is an aerosol. Suitable materials to be sprayed include, without limitation, cosmetic materials such as deodorants, perfumes, hair sprays, cleansers, and polishing agents as well as medicinal materials such as anti-asthma and anti-halitosis medications.

In another process embodiment, a process for removing water from 1,1,1,2-tetrafluoroethane is provided, which process comprises the step of distilling a mixture of 1,1,1,2-tetrafluoroethane, HFC-245fa, 2-methylbutane and water to separate an azeotrope or azeotrope-like composition consisting essentially of HFC-134a, HFC-245fa, 2-methylbutane and water from HFC-134a present in excess of the concentration of said azeotrope. Thus, an HFC-134a/HFC-245fa/2-methylbutane/water azeotrope can be used to remove bulk amounts of water in a HFC-134a manufacturing process. In a commercial process, trace amounts of acidic components in HFC-134a may be removed by water wash. After water washing, the HFC-134a layer is phase-separated. Accordingly, in another embodiment of the invention, a process is provided in which a mixture of 1,1,1,2-tetrafluoroethane/HFC-245fa/2-methylbutane/water is phase separated to remove bulk amounts of water before conducting said distillation step. Residual amounts of water in the HFC-134a phase can be distilled out because of the existence of the HFC-134a/HFC-245fa/2-methylbutane/water azeotrope. Subsequent distillation or multiple distillations can be used to remove trace amounts of water along with other impurities to achieve the desired purity.

The components of the composition of the invention are known materials that are commercially available or may be prepared by known methods. Preferably, the components are of sufficiently high purity so as to avoid the introduction of adverse influences upon cooling or heating properties, constant boiling properties, or blowing agent properties of the system. In the case of metered dose inhalers, the relevant current Good Manufacturing Process may be used for manufacturing these materials.

Additional components may be added to tailor the properties of the azeotrope-like compositions of the invention as needed. By way of example, oil solubility aids may be added in the case in which the compositions of the invention are used as refrigerants. Stabilizers and other materials may also be added to enhance the properties of the compositions of the invention.

EXAMPLES

Example 1

An ebulliometer consisting of vacuum jacketed tube with a condenser on top is used. About 20 g HFC-134a are charged to the ebulliometer and then HFC-245fa is added in small, measured increments, 2-methylbutane is added in small, measured increments and water is added in small, measured increments. Temperature depression is observed when HFC-245fa, 2-methylbutane and water are added to HFC-134a, indicating a quaternary minimum boiling azeotrope is formed. From about 0.1 to about 30 weight percent HFC-245fa, about 1 to about 20 weight percent 2-methylbutane, and from 0.1 to 9–10 weight percent of water, the boiling point of the composition changes by about 1° C. or less. The quaternary mixtures shown in Table 2 are studied and the boiling point of the compositions changes by about 1° C. or less. Therefore, the composition exhibits azeotrope and/or azeotrope-like properties over this range.

TABLE 2

| Wt % (134a/245fa mix 92.9:7.1) | Wt % 2-Methylbutane | Wt % Water | T(° C.) @14.61 psia |
|---|---|---|---|
| 97.89 | 2.11 | 0.00 | −25.78 |
| 97.50 | 2.10 | 0.40 | −25.78 |
| 97.12 | 2.09 | 0.79 | −25.78 |
| 95.60 | 2.06 | 2.34 | −25.78 |
| 94.12 | 2.03 | 3.85 | −25.78 |
| 92.70 | 2.00 | 5.30 | −25.78 |
| 91.32 | 1.97 | 6.71 | −25.78 |
| 89.97 | 1.94 | 8.09 | −25.78 |

TABLE 2-continued

| Wt % (134a/245fa mix 92.9:7.1) | Wt % 2-Methylbutane | Wt % Water | T(° C.) @14.61 psia |
|---|---|---|---|
| 88.67 | 1.91 | 9.42 | −25.78 |
| 87.41 | 1.88 | 10.71 | −25.78 |

FIG. 1 is a graphical representation of the boiling point data listed in Table 2.

Example 2

100 g of a polyether with a hydroxyl value of 380, a result from the addition of propylene oxide to a solution of saccharose, propylene glycol and water, is mixed with 2 g of a siloxane polyether copolymer as foam stabilizer, and 3 g of dimethylcyclohexylamine. With stirring, 100 g of the mixture is thoroughly mixed with 15 g of an azeotrope-like composition of HFC-134a, HFC-245fa, and methyl butane as a blowing agent. The resulting mixture is foamed with 152 g of crude 4,4' diisocyanatodiphenylmethane. The resulting rigid foam is inspected and found to be of good quality.

Example 3

This example illustrates the thermal data associated with foams prepared using blowing agent compositions according to the present invention.

Foam #1 is prepared by a general procedure commonly referred to as "handmixing". For each blowing agent or blowing agent pair, a premix of polyol, Terate 2541, surfactant, Tegostab B8433, and catalyst, Dabco K-15 and Polycat 8, is prepared in the same proportions displayed in Table 3. About 2 kg is blended to insure that all of the foams in a given series are made with the same master batch of premix. The premix is blended in a one-gallon paint can, and stirred at about 1500 rpm with a Conn 2" diameter ITC mixer until a homogenous blend is achieved. When mixing was complete the material is transferred to a one-gallon glass bottle and sealed. The bottle is then placed in a refrigerator controlled at 32° F. The foam blowing agents are premixed and kept in the a refrigerator, along with the 32 oz. tin cans used for mixing vessels. The A-component, isocyanate, is kept in sealed containers at 70° F.

TABLE 3

| Component (pbw) | Foam #1 |
|---|---|
| Terate 2541[1] | 100.00 |
| Tegostab B8433[2] | 2.00 |
| Polycat 8[3] | 0.25 |
| Dabco K-15[3] | 2.80 |
| Azeotropic blend of HFC-245 fa/HFC-134a/methyl butane/water | 38.00 |
| Lupranate M70L[4] | 150.10 |
| Index | 250 |

[1]Polyol from COSA; hydroxyl number = 240
[2]Surfactant from GoldschmidtChemical Company
[3]Catalyst from Air Products & Chemicals Inc.
[4]A Polymethylene poly(phenyl isocyanate) mixture containing about 40% by weight of methylenebis(phenyl isocyanate) with the balance being polymethylene poly(phenyl isocyanate) having a functionality greater than 2; isocyanate equivalent weight = about 134; from BASF Corp.

For the individual foam preparations, an amount of B-component equal to the formulation weight is weighted into a 32 oz. tin can preconditioned at 32° F. To this is added the required amount of the blowing agent blend, also preconditioned to 32° F. The contents are stirred for two-minutes with a Conn 2" ITC mixing blade turning at about 1000 rpm. Following this, the mixing vessel and contents are reweighed. If there is a weight loss, the lower boiling blowing agent is added to make up the loss. The contents are stirred for an additional 30 seconds, and the can is replaced in the refrigerator.

After the contents are cooled again to 32° F., approximately 10 minutes, the mixing vessel is removed from the refrigerator and taken to the mixing station. A pre-weighed portion of A-component, isocyanate, is added quickly to the B-component, the ingredients mixed for 10 seconds using a Conn 2" diameter ITC mixing blade at 3000 rpm and poured into an 8"×8"×4" cardboard cake box and allowed to rise. Cream, initiation, gel and tack free times are recorded for the individual polyurethane foam samples.

The foams are allowed to cure in the boxes at room temperature for at least 24 hours. After curing, the blocks are trimmed to a uniform size and densities measured. Any foams that do not meet the density specification 2.0±0.1 lb/ft 3 are discarded, and new foams prepared using an adjusted amount of blowing agent in the formulation to obtain the specified density.

After ensuring that all the foams meet the density specifications, the foams are tested for k-factor according to ASTM C518. The resulting rigid foam is inspected and found to be of good quality.

What is claimed is:

1. An azeotrope-like composition consisting essentially of from about 1 to about 50 weight percent water, from about 1 to about 50 weight percent 2-methylbutane, from about 1 to about 50 weight percent HFC-245fa and from about 97 to about 10 weight percent 1,1,1,2-tetrafluoroethane, which compositions have a boiling point of −25.80° C.±4 at 14.61 psia.

2. The azeotrope-like composition of claim 1 consisting essentially of from about 1 to about 25 weight percent water, from about 1 to about 25 weight percent 2-methylbutane, from about 1 to about 25 weight percent HFC-245fa and from about 97 to about 40 weight percent 1,1,1,2-tetrafluoroethane.

3. The azeotrope-like composition of claim 1 consisting essentially of from about 1 to about 10 weight percent water, from about 1 to about 10 weight percent 2-methylbutane, from about 1 to about 10 weight percent HFC-245fa and from about 97 to about 70 weight percent 1,1,1,2-tetrafluoroethane.

4. A blowing agent composition comprising an azeotrope-like composition of claim 1.

5. A blowing agent composition comprising an azeotrope-like composition of claim 2.

6. A blowing agent composition comprising an azeotrope-like composition of claim 3.

7. A method for producing polyurethane and polyisocyanurate foams comprising reacting and foaming a mixture of ingredients that react to form the polyurethane and polyisocyanurate foams in the presence of a volatile blowing agent comprising an azeotrope-like composition of claim 1.

8. A method for producing polyurethane and polyisocyanurate foams comprising reacting and foaming a mixture of ingredients that react to form the polyurethane and polyisocyanurate foams in the presence of a volatile blowing agent comprising an azeotrope-like composition of claim 2.

9. A method for producing polyurethane and polyisocyanurate foams comprising reacting and foaming a mixture of ingredients that react to form the polyurethane and polyisocyanurate foams in the presence of a volatile blowing agent comprising an azeotrope-like composition of claim 3.

10. A closed cell foam composition prepared by foaming a polyisocyanate or polyisocyanurate in the presence of a blowing agent comprising an azeotrope-like composition of claim 1.

11. A closed cell foam composition prepared by foaming a polyisocyanate or polyisocyanurate in the presence of a blowing agent comprising an azeotrope-like composition of claim 2.

12. A closed cell foam composition prepared by foaming a polyisocyanate or polyisocyanurate in the presence of a blowing agent comprising an azeotrope-like composition of claim 3.

13. A premix of a polyol and a blowing agent comprising an azeotrope-like composition of claim 1.

14. A premix of a polyol and a blowing agent comprising an azeotrope-like composition of claim 2.

15. A premix of a polyol and a blowing agent comprising an azeotrope-like composition of claim 3.

16. A sprayable composition comprising a material to be sprayed and a propellant comprising an azeotrope-like composition of claim 1.

17. A sprayable composition according to claim 16 wherein the sprayable composition is an aerosol.

18. A sprayable composition according to claim 17 wherein the sprayable composition is a cosmetic material.

19. The composition of claim 17 wherein the material to be sprayed is a medicinal material.

20. A process for removing water from 1,1,1,2-tetrafluoroethane which process comprises distilling a mixture of 1,1,1,2-tetrafluoroethane, HFC-245fa, 2-methylbutane and water to separate an azeotrope or azeotrope-like composition consisting essentially of 1,1,1, 2-tetrafluoroethane, HFC-245fa, 2-methylbutane and water from 1,1,1,2-tetrafluoroethane present in excess of the concentration of said azeotrope.

21. A process as described in claim 20 wherein said mixture of 1,1,1,2-tetrafluoroethane, HFC-245fa, 2-methylbutane and water is phase separated to remove bulk amounts of water before conducting said distillation step.

22. A closed cell foam containing a cell gas comprising a blowing agent of claim 4.

23. A closed cell foam containing a cell gas comprising a blowing agent of claim 5.

24. A closed cell foam containing a cell gas comprising a blowing agent of claim 6.

* * * * *